(No Model.)
W. H. & W. P. JONES.
ROTARY FAN.
No. 418,190. Patented Dec. 31, 1889.
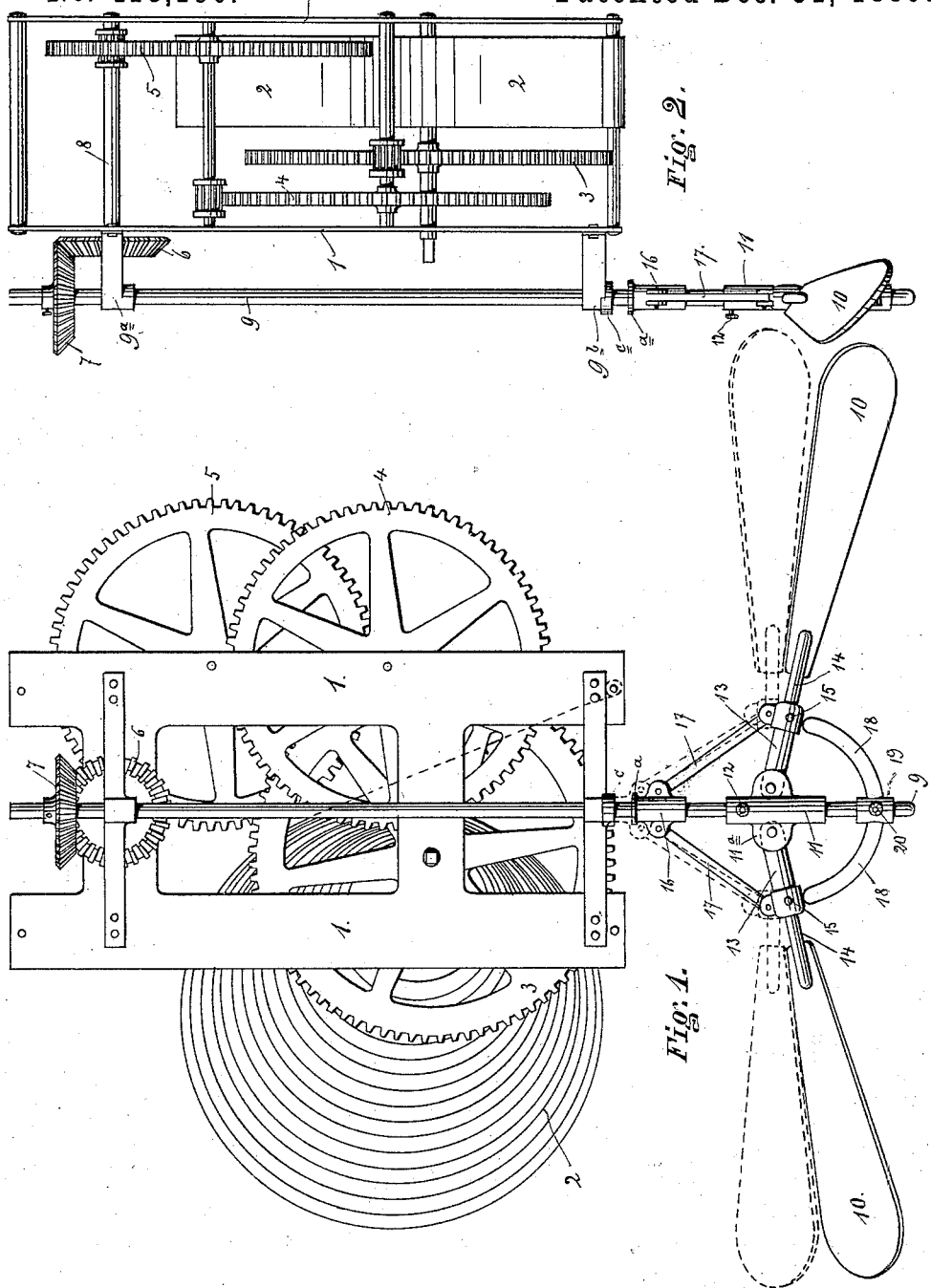
WITNESSES.
Rich. George
Edwin McKesley
INVENTOR.
W. H. Jones
W. P. Jones
By Resley & Parry
Attys

UNITED STATES PATENT OFFICE.

WILLIS H. JONES AND WILLIAM P. JONES, OF UTICA, NEW YORK.

ROTARY FAN.

SPECIFICATION forming part of Letters Patent No. 418,190, dated December 31, 1889.

Application filed July 29, 1889. Serial No. 318,994. (No model.)

*To all whom it may concern:*

Be it known that we, WILLIS H. JONES and WILLIAM P. JONES, both of the city of Utica, in the county of Oneida and State of New York, have invented certain new and useful Improvements in Rotary Fans; and we do hereby declare that the following is a full, clear, and exact description of the invention, which will enable others skilled in the art to which it appertains to make and use the same, reference being had to the accompanying drawings, and to the letters and figures of reference marked thereon, which form part of this specification.

Our invention relates to improvements in rotary fans.

In the drawings which accompany and form a part of this specification, and in which similar letters and figures of reference refer to like parts in the several figures, Figure 1 shows a side elevation of our device, and Fig. 2 shows an edge elevation on a quarter turned to the left from that of Fig. 1.

Reference being had to the reference numerals and letters, the frame is indicated by 1.

2 is the driving-spring.

3, 4, and 5 is a train of clock-work transmitting gear-wheels, which, through spring 2, imparts a rotary motion to shaft 8.

6 and 7 are meshing beveled gear-wheels, by which the rotary motion of shaft 8 is transmitted to vertical shaft 9, on the opposite end of which the fan arms or blades 10 10 are mounted, as follows:

11 is a collar upon the shaft, which is adjustably secured to the shaft by set-screw 12. To ears 11$^a$ of collar 11 the fan arms or blades are pivoted, so as to permit of a vertically-swinging movement of their outer free ends. The fan-blades are constructed to run at an acute angle to the plane of rotation, with the upper edge in advance, and the arm is preferably constructed in sections 13 and 14, section 13 being tubular, and section 14 entering it and secured therein by set-screw 15, by means of which the length of arm and the angle of the blade may be adjusted and regulated.

16 is a movable collar upon the shaft 9, which is provided with a flange $a$, and the collar is connected by connecting-rods 17 with the arms 10. A stationary flange $c$ is provided upon the lower end of bearing 9$^b$.

18 18 are supporting-arms mounted upon a collar 19, adjustably secured upon the shaft 9 by set-screw 20, the arms 18 being designed to prevent the blades 10 swinging below a certain position.

In operation the speed will be regulated by the friction of flange 8$^a$ against flange $c$, which is caused by the blades swinging upward as they cut through the air, as shown in dotted lines, and by adjusting collar 11 on the shaft 9 by means of set-screw 12 the speed may be changed or varied.

It is evident that a collar adjustably secured upon the shaft 9 between collars 11 and 16 might be substituted in lieu of arms 18 and collar 19, and other alterations and variations in and from the construction shown made without departing from the spirit of our invention or the equivalent of our construction.

What we claim as new, and desire to secure by Letters Patent, is—

1. The combination of the driving-spring, the pivoted swinging fan-blades, the shaft carrying the blades, the stationary friction-flange, the movable friction-flange, and the connection between the blades and movable flange, substantially as set forth.

2. The combination of the driving-springs, the pivoted swinging fan-blades hung at an acute angle to the plane of rotation, the shaft carrying the fan-blades, the stationary friction-flange, the movable friction-flange, and the connecting-rod between the movable friction-flange and the fan-blade, substantially as set forth.

3. The combination of the driving-spring, the adjustable pivoted swinging fan-blades hung at an acute angle to the plane of rotation, the shaft carrying the fan-blades, the transmitting-gear between the spring and the shaft, the stationary friction-flange, the movable friction-flange, and the connecting-rods between the movable flange and the fan-blades, substantially as set forth.

In witness whereof we have affixed our signatures in presence of two witnesses.

WILLIS H. JONES.
WILLIAM P. JONES.

Witnesses:
EDWARD H. RISLEY,
E. W. JONES.